United States Patent Office 3,204,730
Patented Sept. 7, 1965

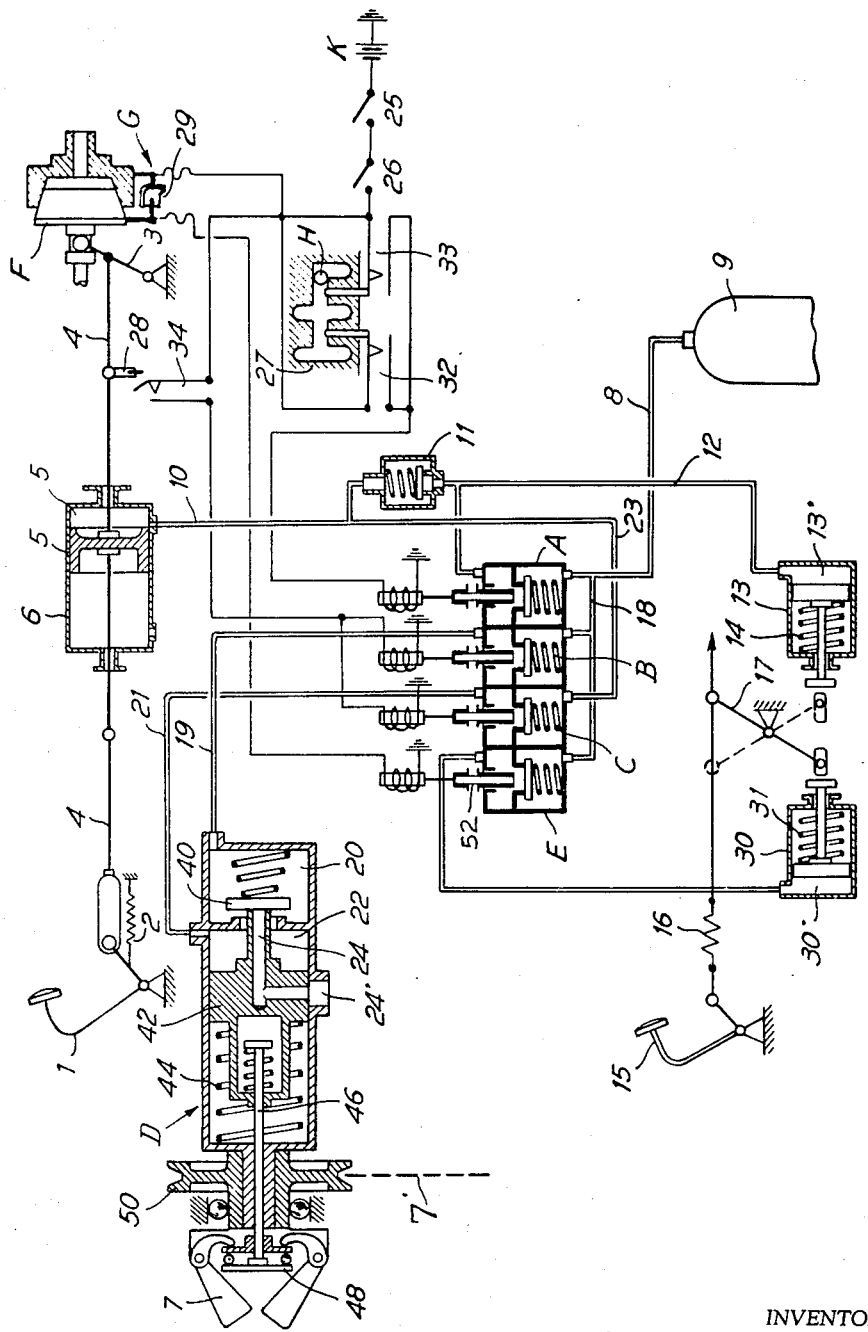

3,204,730
AUTOMATIC FRICTION CLUTCH CONTROL
OF MOTOR VEHICLES
Giuseppe Alfieri and Roberto Moriondo, Milan, Italy, assignors to Fabrica Italiana Magneti Marelli S.p.A., Milan, Italy, a corporation of Italy
Filed Mar. 26, 1962, Ser. No. 182,441
Claims priority, application Italy, Apr. 1, 1961, 11,869
3 Claims. (Cl. 192—.08)

The present invention refers to a pneumatic friction clutch control for motor vehicles.

Control devices performing automatically and sequentially all of the operations usually carried out by the driver through a friction clutch, for the starting and stopping of the motor vehicle and the control of the transmission in passage from a lower speed to a higher speed, and vice versa, are well-known in the field of motor vehicle controls. They generally involve hydraulic or pneumatic means for controlling the clutch. The power required for a pneumatic clutch control is commonly derived from the compressed air plant. The operational sequence is controlled by electrically-operated valves which are under the control of switches associated with the control lever of the transmission and with the friction clutch control. A manually operated switch may be used to turn off the automatic device in particular cases and when it is required to release the clutch for direct driver controlled operation.

The gradual engagement of the friction clutch is insured by a distributor controlled by a centrifugal governor driven by the engine to start friction clutch engagement when the engine reaches a predetermined speed.

An object of the present invention is to provide a pneumatic self-acting control which, contrary to the known devices of this kind, enables the friction clutch to be kept engaged by automatic control without any particular action of the driver, irrespective of the gear ratio and the engine speed.

Another object of the present invention is to provide safe and regular automatic operation of friction clutch engaging and release, and a rather low production cost.

A further object of the present invention is to provide a device for starting a vehicle in a greater or smaller time interval according to the vehicle load conditions and road slope, which is independent of transmission control time and the moment at which speed engaging takes place.

In order to prevent driver errors the pneumatic servocontrol brings the control lever of the carburetor throttle valve to the "idling" position whenever the friction clutch is released to ensure complete disengagement of the friction clutch itself which would be prevented if the engine were maintained at a high speed.

A servocontrol may be provided to carry out the passage from a higher to a lower speed wherein this servocontrol would act upon the control lever of the carburetor throttle valve releasing the lever, when the lower speed is reached, in such a way that the engine is accelerated and therefore re-engaging of the friction clutch takes place without any return shock on the vehicles as is often noticeable when this operation is carried out manually by the driver.

The device according to the invention is substantially characteried in that it comprises: a first three-way electrovalve fed by a compressed air source and arranged to supply air to a friction clutch disengaging cylinder through a check valve and to a servocontrolled cylinder that restores the accelerator to the idling position; second and third three-way electrovalves that act simultaneously, the second of which is connected between the compressed air source and the feed pipe of a three-way distributor which is controlled by a centrifugal governor coupled to the engine drive shaft; in the distributor, a hollow push rod connects a modulation chamber to an exhaust port when the centrifugal governor exceeds a predetermined rotational speed; the third electrovalve is connected between the modulation chamber and the friction clutch disengaging cylinder, downstream of the check valve. The first electrovalve is under the control of first electric switch that is closed only when the transmission control lever is in neutral position. The other two electrovalves are connected to parallel to a second electric switch that is open when the friction clutch is wholly engaged and closed when the friction clutch is wholly released. The electrovalves are electrically controlled valves which, when energied, put into communication with each other the pipes leading to the electrovalves from the air pressure source and the device employing air pressure. When deenergied, the pressure source pipe is shut off and the other pipe open to an exhaust port.

The means by which the foregoing objects and other advantages, which will be apparent to those skilled in the art, are accomplished as set forth in the following specification and claims, and are illustrated in the accompanying drawing dealing with a basic preferred embodiment of the present invention.

Referring now to the figure, 1 indicates the clutch pedal and 2 the return spring relating thereto. The control lever 3 of the clutch F is connected to pedal 1 by means of a tie rod 4 carrying a piston 5. The piston 5 is slidably received in pneumatic first servocontrol 6. The numeral 5' indicates a pressure chamber portion of the servocontrol 6. Pedal 1 allows mechanical clutch operation: when chamber 5' lacks sufficient air pressure; in case of breakdown of the control; in particular circumstances, as for example, the starting of an overloaded vehicle on a road with a heavy gradient (when the clutch is to be inserted at the maximum engine couple); and for vehicle maneuvers to be performed in a restricted space.

The invention includes first, second and third three-way electrovalves A, B and C, respectively, and one three-way distributor D under the control of a centrifugal governor 7 driven by belt 7' connected to the vehicle engine (not shown). Each electrovalve has a normally closed inlet and an outlet which is normally open to an exhaust port (not shown) through a hollow pushrod 52. The first electrovalve A is connected by pipe 8 to a compressed air source 9 and by pipes 10 and 12 to servocontrols 6 and 13, respectively. The valve serves to put under pressure, when energized, or in communication with an exhaust, when deenergized, the first pneumatic servocontrol 6 and the single-acting second servocontrol 13. Pipe 10 has a check 11 located between electrovalve A and the first servocontrol 6.

The second servocontrol 13 is provided with a return spring 14. Servocontrol 13 acts upon the injector pump of the vehicle engine or upon a carburetor throttle valve (not shown) through the lever 17. Accelerator pedal 15 cooperates with second servocontrol 13 through spring 16 and lever 17. The preloaded spring 16 is rigid enough so that it does not yield when the servocontrol is inactive, thus allowing normal accelerator pedal control.

The second electrovalve B is connected to the pressure source 9 through pipes 18 and 8 and serves to activate or deactivate distributor D by way of pipe 19 and inlet chamber 20.

The third electrovalve C is connected to the modulation chamber 22 of distributor D through pipe 21 and to pipes 23 and 10 thereby feeding the clutch operating first servocontrol 6 downstream of check valve 11.

Distributor D is under the control of centrifugal governor 7 which will act upon the distributor when the engine has reached a predetermined minimum of revolutions (e.g. 800 r.p.m.). Distributor D is furnished with a container within which is housed, slidingly, a piston 42, to which is solidly fixed push rod 24 which controls the opening of valve 40. The piston is urged towards valve 40 by the action of spring 44, and is axially connected with stem 46 (although not torsionally connected). Stem 46 extends along the axis of the piston and terminates outside the container with a base 48 on which are acting centrifugal masses 7. The centrifugal masses are actuated by the engine speed by means of pulley 50 and belt 7' attached to a rotating portion of the engine (not shown).

In the standstill position of the engine, or when it is running at less than the predetermined speed, the inlet chamber 20 and the modulation chamber 22 communicate with each other. The distributor D exhaust 24' remains closed (as shown in the drawing) because of the position of bored push rod 24.

The electric portion of the invention includes an ignition switch 25, in series with battery K, under the control of the ignition key, a normally closed manual switch 26 in series with the ignition switch, and a parallel arrangement of first and second switches 27 and 28, respectively. The first switch 27 is connected to the transmission control lever H and opens only when the transmission control lever H is in the position of wholly engaged speeds. The second switch 28 is open when the clutch is wholly engaged (as shown in the drawing) and closed when the clutch is wholly released. Switch 28 includes a pair of contacts 34, and switch 27 comprises contacts 32 and 33. Switch 28 is closed by the movement of the depending portion of tie rod 4 closing contacts 34. Switch 27 is closed by the gear shift lever H striking a shaft connected to one of contacts 32 or 33 forcing the contact closed. The gear shift lever H strikes these shafts when in or when moving through neutral.

Electrovalve A is under the control of switch 27 and the control (contemporaneous and in parallel) of electrovalves B and C is by switch 28. The electrovalves, when energized, place in communication with each other the two pipes leading to each electrovalve and, when deenergized, close off the pipe coming from the pressure source while opening the other pipe to an exhaust.

Starting the vehicle and operation of the device may be described as follows:

Introduction of the key to the ignition switch causes the closing of switch 25, the first switch 27 is closed when the transmission operation lever is in the neutral position and therefore the first electrovalve A energizes. The electrovalve places in communication pipes 8 and 10 so that compressed air flows from tank 9 to pressure chamber 5' with a consequent release of the clutch and closure of the second switch 28. Closing switch 28 causes energization of the second and third electrovalves B and C, respectively, which places air tank 9 in communication, through pipes 8 and 19 and electrovalve B, with chamber 20 of distributor D and cylinder 6 (through pipes 21, 23 and 10 and electrovalve C) with chamber 22 of the distributor D.

Electrovalve A also supplies pressure to the second servocontrol cylinder 13 connected with accelerator 15 by means of lever 17 and spring 16 so the latter moves to a "minimum" position (position of lever 17 shown in the drawing). At standstill of the engine, or at a minimum engine speed after starting thereof, the centrifugal governor 7 does not act upon distributor D. Therefore, chambers 20 and 22 are in communication with each other as shown in the drawing. The kinetic linkage 7' connects the governor 7 with the engine (not shown).

The second switch 27 is open when the gear shift lever is in the first or other speeds, and pipe 12 is in communication with the exhaust by deenergization of the first electrovalve A. The second servocontrol cylinder 13 remains deactivated allowing the usual control of accelerator 15. Check valve 11 prevents pressure leading from cylinder 5' through electrovalve A.

The engine speed is gradually increased by pushing accelerator 15. Centrifugal governor 7 acts upon distributor D to discharge the compressed air from servocontrol 6 through pipe 10, electrovalve C, pipe 21, chambers 22 and 20, bored push rod 24 and exhaust port 24' in such a way that the gradual engagement of the friction clutch takes place. If the couple required to start the vehicle is high, then the engine tends to run at a lower speed and the centrifugal governor 7 acts upon distributor D closing valve 40 and thus allows pressure to servocontrol 6. Instantaneous equilibrium conditions are achieved in such a way between clutch drive and slip so that vehicle starting takes place in due time (depending on the local conditions and road slope) and with due gradualness.

When the clutch is wholly engaged, the second switch 28 opens deenergizing the second and third electrovalves B and C, respectively, and cutting off the communication between tank 9 and chamber 20 of distributor D and between chamber 22 of the latter and the first servocontrol 6. Distributor D, therefore, cannot act upon the first servocontrol 6 and the friction clutch will not release even though the engine turns at a lower speed. This allows the use of the engine as a brake while descending a slope at a reduced speed.

The passage from a lower to a higher speed takes place only by movement of the transmission lever H when the vehicle has reached the speed corresponding to the gear to be inserted. After reaching the actual speed, the first switch 27 is closed and repetition of the above-mentioned cycle takes place. It is enough to operate the transmission control lever H to cause passage from the higher to the lower speed; the first switch 27 closes and repetition of the cycle above referred to takes place again. When the lower speed is engaged, and then the first electrovalve A deenergizes and contemporaneously the clutch plate increases its revolving speed with respect to the engine running at a maximum speed under control of the second electrovalve B. It is, therefore, suitable to cause acceleration of the engine to reach a speed near that of the clutch plate F. A third electric switch 29, of a mechanical type and under a centrifugal action, is actuated by the moving portion of friction clutch F in such a manner that when this clutch portion reaches a given speed, the switch 29 is closed, thus energizing a fourth electrovalve E. The third switch 29 controls the fourth electrovalve E which is connected to tank 9 by pipes 8 and 18, which in turn controls the single-acting third pneumatic servocontrol 30 (provided with a return spring 31). This latter acts upon the control lever of the carburetor throttle in an opposite direction with respect to the action of second servocontrol cylinder 13, that is, to cause engine acceleration until it reaches the clutch plate revolving speed.

The centrifugal governor 7 acts contemporaneously upon the distributor D in such a way as to cause reengaging of friction clutch without any return shock on the vehicle mechanical transmission.

It is enough to move the transmission control lever H to the neutral position to stop the vehicle in such a way that the first switch 27 energizes the first electrovalve A thereby releasing the clutch and causing accelerator to move to the "minimum" position by means of the second servocontrol 13.

Switch 25 is opened by removing the ignition key and thus the electrovalves A, B and C deenergizes so that the compressed air contained in the first servocontrol 6 blows off through electrovalve C and the distributor D as previously described. The clutch remains engaged in such a way that, by inserting the gear shift lever in a non-neutral position, the engine can be used as an auxiliary braking means.

The automatic device can be released by opening the usual switch 26, disconnecting the battery K from the first, second and third switches 27, 28 and 29, respectively. This can be useful when the vehicle starting takes place on a heavy gradient with a heavy load or overload on a tractor and trailer; in such conditions the automatic control could have some drawbacks. Clutch operation is carried out in this case by pedal 1.

The automatic control can be released by means of switch 26 also when the vehicle has to perform very slow movements in a restricted space (e.g. to hook or engage a trailer or semitrailer or to enter a parking place with very slow motion).

It is to be understood that the embodiment details of the device may be modified with respect to the exemplified embodiment without departing from the spirit of the invention or the scope of the appended claims.

We claim:

1. In a pneumatic friction clutch control system for motor vehicles, the combination comprising a friction clutch, an accelerator, manual clutch control means and a manual accelerator control means, first and second pneumatic servocontrol means connected to said clutch control and accelerator control means respectively, means to automatically actuate both said servo-control means comprising a first electrovalve means having an inlet and outlet, said inlet connected to a source of air pressure and said outlet connected to both said servocontrol means, a first electric switch means electrically connected between a source of power and said first electrovalve means and operatively connected to a gearbox lever means to close said first switch only when said lever is in neutral position thereby energizing said first electrovalve means which activates said servocontrol means to disengage said clutch and to move said accelerator to idling, a distributor means having first and second chambers, a normally open valve means interconnecting said chambers, centrifugal governor means responsive to engine speed connected to close said valve means upon reaching a predetermined engine speed, a second and third electrovalve means each having an inlet and an outlet, the inlet and outlet of said second electrovalve means being connected to said pressure source and to said first chamber respectively, the inlet and outlet of said third electrovalve means being connected to said first servocontrol means and to said second chamber respectively, a second electric switch means electrically connected between said source of power and said second and third electrovalve means and operatively connected to said clutch control means to energize said second and third electrovalve means upon clutch disengagement, said second electrovalve means closing said normally open valve means upon energization, said third electrovalve means upon energization providing exhaust means to disengage said first pneumatic servocontrol means whereby upon said gearbox lever passing through neutral while changing gears said clutch will be disengaged, said accelerator moved to idle and said clutch smoothly reengaged.

2. In a pneumatic friction clutch control system for motor vehicles according to claim 1 wherein a one-way check valve means is connected between said first pneumatic servocontrol means and said first electrovalve thereby preventing deactivation of said first pneumatic servocontrol through the exhaust of said first electrovalve.

3. In a pneumatic friction clutch control system for motor vehicles according to claim 1 wherein a third pneumatic servocontrol means is connected to said accelerator control member in opposition to said second servocontrol means, a fourth electrovalve means connected between said air pressure source and said third servocontrol means, a third electric switch responsive to centrifugal action of said clutch and operatively connected to said fourth electrovalve to energize same upon the clutch reaching a predetermined speed thereby causing said third servocontrol means to be actuated to oppose said second servocontrol means thereby depressing said accelerator.

References Cited by the Examiner

UNITED STATES PATENTS

| 2,169,216 | 8/39 | Bloxsom | 192—3.5 X |
| 2,206,586 | 7/40 | Struck. | |
| 2,234,463 | 3/41 | Brewer | 192—3.5 X |
| 2,235,943 | 3/41 | Mylins | 192—3.5 X |
| 2,616,538 | 11/52 | Price | 192—3.5 X |
| 2,739,678 | 3/56 | Parker | 192—.08 X |

DON A. WAITE, *Primary Examiner.*
ROBERT C. RIORDON, *Examiner.*